(12) United States Patent
Li et al.

(10) Patent No.: US 12,501,423 B2
(45) Date of Patent: Dec. 16, 2025

(54) RESOURCE ALLOCATION METHOD AND APPARATUS, USER EQUIPMENT, NETWORK DEVICE, AND MEDIUM

(71) Applicant: VIVO MOBILE COMMUNICATION CO., LTD., Guangdong (CN)

(72) Inventors: Na Li, Guangdong (CN); Gen Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 814 days.

(21) Appl. No.: 17/727,382

(22) Filed: Apr. 22, 2022

(65) Prior Publication Data
US 2022/0248433 A1 Aug. 4, 2022

Related U.S. Application Data

(63) Continuation of application No. PCT/CN2020/126144, filed on Nov. 3, 2020.

(30) Foreign Application Priority Data

Nov. 7, 2019 (CN) .......................... 201911083828.7

(51) Int. Cl.
*H04W 72/12* (2023.01)
*H04L 27/26* (2006.01)
(Continued)

(52) U.S. Cl.
CPC ... *H04W 72/1268* (2013.01); *H04L 27/26025* (2021.01); *H04W 72/044* (2013.01); *H04W 72/23* (2023.01); *H04W 74/0816* (2013.01)

(58) Field of Classification Search
CPC ......... H04W 72/1268; H04W 72/0816; H04W 72/23; H04W 74/044; H04L 27/2602
See application file for complete search history.

(56) References Cited

U.S. PATENT DOCUMENTS

| 9,420,576 B2 | 8/2016 | Chen et al. |
| 2014/0314007 A1 | 10/2014 | Chen et al. |

(Continued)

FOREIGN PATENT DOCUMENTS

| CN | 110022194 A | 7/2019 |
| WO | 2019193733 A1 | 10/2019 |

OTHER PUBLICATIONS

Extended European Search Report for Application No. 20885349. 9-1213, dated Nov. 22, 2022, 10 Pages.
(Continued)

*Primary Examiner* — Gbemileke J Onamuti
(74) *Attorney, Agent, or Firm* — BROOKS KUSHMAN P.C.

(57) ABSTRACT

Resource allocation method and apparatus, user equipment, network device, and medium are disclosed. The resource allocation method is applied to user equipment, and the resource allocation method includes: receiving configuration information, where the configuration information includes indication information whether a physical uplink shared channel PUSCH with an interlaced structure is used or not; and determining, according to the indication information whether a PUSCH with an interlaced structure is used or not, a resource allocation type for a PUSCH scheduled by DCI format 0_0 or a quantity X of bits included in frequency domain resource assignment indication information in the DCI format 0_0, where the resource allocation type includes an uplink resource allocation type 1 or a resource allocation type for interlaced structures, and X is a positive integer.

20 Claims, 2 Drawing Sheets

(51) Int. Cl.
    *H04W 72/04*      (2023.01)
    *H04W 72/044*      (2023.01)
    *H04W 72/1268*      (2023.01)
    *H04W 72/23*      (2023.01)
    *H04W 74/08*      (2024.01)
    *H04W 74/0816*      (2024.01)

(56) References Cited

U.S. PATENT DOCUMENTS

| | | |
|---|---|---|
| 2019/0149365 A1 | 5/2019 | Chatterjee et al. |
| 2021/0045139 A1 | 2/2021 | Takeda et al. |
| 2022/0271874 A1* | 8/2022 | Behravan ............ H04L 1/1861 |

OTHER PUBLICATIONS

Samsung, "Uplink Signal and Channel Design for NR-U," 3GPP TSG-RAN WG1 #98bis, Agenda item 7.2.2.1.3, Oct. 14-20, 2019, R1-1910458, Chongqing, China, 7 Pages.
Ericsson, "UL Signals and Channels for NR-U," 3GPP TSG-RAN WG1 #98bis, Agenda item 7.2.2.1.3, Oct. 14-20, 2019, R1-1910946, Chongqing, China, 24 Pages.
Ericsson, "Feature Lead Summary for UL Signals and Channels," 3GPP TSG-RAN WG1 #98b, Agenda item 7.2.2.1.3, Aug. 14-20, 2019, R1-19011484, Chongqing, China, 27 Pages.
First Office Action for Singapore Application No. 11202204169V, dated Feb. 19, 2024, 10 Pages.
NTT Docomo, Inc. "Ul signals and channels for NR-U" 3GPP TSG RAN WG1 #98bis, Chongqing, China, Oct. 2019, R1-1911159, 7 Pages.
Ericsson "Feature lead summary 3 for UL Signals and Channels" 3GPP TSG-RAN WG1 Meeting #98b, Chongqing, China, Aug. 2019, R1-1911674, 29 Pages.
First Office Action for Chinese Application No. 201911083828.7, dated Jan. 24, 2022, 8 Pages.
First Office Action for Indian Application No. 202227023057, dated Sep. 6, 2022, 5 Pages.
Nokia et al., "Remaining NR-U Enhancements for Uplink Signals and Channels," 3GPP TSG RAN WG1 #98bis, Agenda item 7.2.2.1.3, Oct. 14-20, 2019, R1-1910594, Chongqing, China, 20 Pages.
Ericsson, "UL Signals and Channels for Nr-U," 3GPP TSG-RAN WG1 #98, Agenda item 7.2.2.1.3, Aug. 26-30, 2019, R1-1909297, Prague, Czech Republic, 20 Pages.
3rd Generation Partnership Project. Technical Specification Group Radio Access Network; NR; Multiplexing and channel coding (Release 15). 3GPP TS 38.212 V15.7.0. Online. Sep. 2019. 98 pages.
First Japanese Office Action for Japanese Patent Application No. 2024-000532 dated Feb. 13, 2025. 10 pages.
Second European Office Action for European Patent Application No. 20885349.9 mailed Oct. 10, 2025. 10 pages.

* cited by examiner

RESOURCE ALLOCATION METHOD AND APPARATUS, USER EQUIPMENT, NETWORK DEVICE, AND MEDIUM

CROSS-REFERENCE TO RELATED APPLICATIONS

This application is continuation of PCT International Application No. PCT/CN2020/126144 filed on Nov. 3, 2020, which claims priority to Chinese Patent Application No. 201911083828.7, filed on Nov. 7, 2019, which are incorporated herein by reference in their entireties.

TECHNICAL FIELD

Embodiments of this disclosure relate to the communications field, and in particular, to a resource allocation method and apparatus, user equipment, a network device, and a medium.

BACKGROUND

A network device may schedule a physical uplink shared channel (PUSCH) by using downlink control information (DCI) format 0_0 or DCI format 0_1.

The DCI format 0_1 (non-fallback downlink control information, non-fallback DCI) supports an uplink resource allocation type 0 (type 0) or an uplink resource allocation type 1 (type 1). Alternatively, if dynamic change is configured for resource allocation type, the uplink resource allocation type 0 or the uplink resource allocation type 1 may be dynamically indicated.

However, no resource allocation scheme is available at present for the DCI format 0_0 (fallback downlink control information, fallback DCI).

SUMMARY

Embodiments of this disclosure provide a resource allocation method.

This disclosure is implemented as follows.

According to a first aspect, an embodiment of this disclosure provides a resource allocation method, applied to user equipment, where the method includes:
  receiving configuration information, where the configuration information includes indication information whether a physical uplink shared channel PUSCH with an interlaced structure is used or not; and
  determining, according to the indication information whether a PUSCH with an interlaced structure is used or not, a resource allocation type for a PUSCH scheduled by DCI format 0_0 or a quantity X of bits included in frequency domain resource assignment indication information in the DCI format 0_0, where the resource allocation type includes an uplink resource allocation type 1 or a resource allocation type for interlaced structures, and X is a positive integer.

According to a second aspect, an embodiment of this disclosure provides a resource allocation method, applied to a network device, where the method includes:
  transmitting configuration information to user equipment, where the configuration information includes indication information whether a physical uplink shared channel PUSCH with an interlaced structure is used or not, such that the user equipment determines, according to the indication information, a resource allocation type for a PUSCH scheduled by DCI format 0_0 or a quantity X of bits included in frequency domain resource assignment indication information in the DCI format 0_0, where the resource allocation type includes an uplink resource allocation type 1 or a resource allocation type for interlaced structures, and X is a positive integer.

According to a third aspect, an embodiment of this disclosure provides a resource allocation apparatus, applied to user equipment, where the apparatus includes:
  a configuration information receiving module, configured to receive configuration information, where the configuration information includes indication information whether a physical uplink shared channel PUSCH with an interlaced structure is used or not; and
  a determining module, configured to determine, according to the indication information whether a PUSCH with an interlaced structure is used or not, a resource allocation type for a PUSCH scheduled by DCI format 0_0 or a quantity X of bits included in frequency domain resource assignment indication information in the DCI format 0_0, where the resource allocation type includes an uplink resource allocation type 1 or a resource allocation type for interlaced structures, and X is a positive integer.

According to a fourth aspect, an embodiment of this disclosure provides a resource allocation apparatus, applied to a network device, where the apparatus includes:
  a configuration information transmitting module, configured to transmit configuration information to user equipment, where the configuration information includes indication information whether a physical uplink shared channel PUSCH with an interlaced structure is used or not, such that the user equipment determines, according to the indication information, a resource allocation type for a PUSCH scheduled by DCI format 0_0 or a quantity X of bits included in frequency domain resource assignment indication information in the DCI format 0_0, where the resource allocation type includes an uplink resource allocation type 1 or a resource allocation type for interlaced structures, and X is a positive integer.

According to a fifth aspect, an embodiment of this disclosure provides user equipment, including a processor, a memory, and a computer program stored in the memory and capable of running on the processor, where when the computer program is executed by the processor, the steps of the resource allocation method are implemented.

According to a sixth aspect, an embodiment of this disclosure provides a network device, including a processor, a memory, and a computer program stored in the memory and capable of running on the processor, where when the computer program is executed by the processor, the steps of the resource allocation method are implemented.

According to a seventh aspect, an embodiment of this disclosure provides a computer-readable storage medium, where the computer-readable storage medium stores a computer program, and when the computer program is executed by a processor, the steps of the resource allocation method are implemented.

BRIEF DESCRIPTION OF DRAWINGS

This disclosure can be better understood in the following descriptions of embodiments of this disclosure with reference to the accompanying drawings. Same or similar reference signs indicate same or similar features.

DETAILED DESCRIPTION

Figure 1:
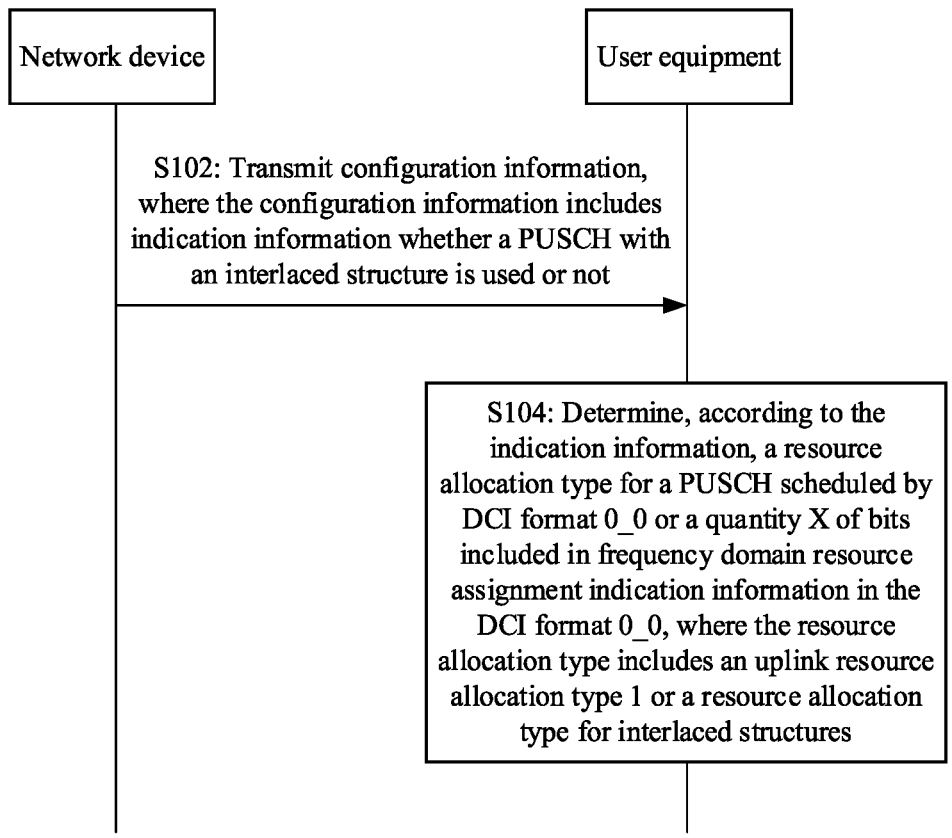
FIG. 1 is an exemplary schematic flowchart of a resource allocation method according to a first aspect and a second aspect of this disclosure.

The following clearly describes the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

For better understanding of the embodiments of this disclosure, the following first describes uplink resource allocation types of NR.

Uplink scheduling frequency domain resource assignment of NR is mainly used for determining a resource block (RB) set allocated for PUSCH transmission, and for uplink dynamic scheduling, this is indicated by a frequency domain resource assignment (FDRA) field in DCI format 0_0 or DCI format 0_1.

The following describes uplink resource allocation schemes supported by NR in Rel-15.

An example of an uplink resource allocation type 0 is as follows:

Resource blocks in a target uplink bandwidth part (BWP) for resource allocation are divided into a plurality of resource block groups (RBG). Each RBG corresponds to a set constituted by up to P consecutive virtual resource blocks (VRB), and P is determined based on a higher layer parameter configuration, a quantity of resource blocks included in the target uplink BWP, and Table 1 (Table 6.1.2.2.1-1). The higher layer parameter configuration indicates which column in Table 6.1.2.2.1-1, that is, configuration 1 or configuration 2, is used.

TABLE 1

| Carrier bandwidth part size (Carrier Bandwidth Part Size) | Configuration 1 | Configuration 2 |
|---|---|---|
| 1 to 36 | 2 | 4 |
| 37 to 72 | 4 | 8 |
| 73 to 144 | 8 | 16 |
| 145 to 275 | 16 | 16 |

The FDRA field in the DCI format 0_1 uses a bitmap manner to indicate whether the RBGs in the target uplink BWP are allocated to user equipment (UE) or not. Bits in the bitmap correspond one to one to the RBGs in the target uplink BWP. A bit in the bitmap set to 1 indicates that its corresponding RBG is allocated to UE. That is, all resource blocks included in this RBG are allocated to UE.

The DCI format 0_0 does not support uplink resource allocation type 0.

An example of an uplink resource allocation type 1 is as follows:

The type 1 supports indicating a set constituted by consecutive non-interlaced VRBs that are allocated. Assuming that a starting VRB number in this VRB set is $RB_{start}$ (this number may be a local number in a target uplink BWP) and a quantity of the consecutive VRBs that are allocated is $L_{RBs}$, a RIV (Resource Indication Value) is calculated according to the following formula:

If a condition $(L_{RBs}-1) \leq \lfloor N_{BWP}^{size}/2 \rfloor$ is met, $RIV = N_{BWP}^{size}(L_{RBs}-1) + RB_{start}$; if the condition is not met, $RIV = N_{BWP}^{size}(N_{BWP}^{size}-L_{RBs}+1) + (N_{BWP}^{size}-1-RB_{start})$.

Herein, $N_{BWP}^{size}$ is a quantity of VRBs included in the target uplink BWP, and $L_{RBs} \geq 1$ and cannot be greater than $N_{BWP}^{size} - RB_{start}$.

A RIV is indicated in the FDRA field in the DCI format 0_0 or the DCI format 0_1, so as to indicate a VRB set allocated to the UE.

The uplink resource allocation type 1 supports frequency hopping (Frequency Hopping) transmission, and may be indicated by the FDRA field in the DCI format 0_0 or the DCI format 0_1.

The foregoing has described uplink resource allocation types of NR, and the following describes unlicensed communications systems.

In future communications systems, unlicensed bands may be used as a supplement to licensed bands to help operators expand their services. As unlicensed bands are shared by a plurality of technologies (Radio Access Technology, RAT), such as Wi-Fi, radar, and long term evolution (LTE) based licensed-assisted access to unlicensed spectrum (LTE-LAA), in some countries or regions, use of unlicensed bands must comply with regulations to ensure that all equipment can equally share these resources, for example, listen before talk (LBT), and maximum channel occupancy time (MCOT). To transmit information, a transmission node needs to execute LBT on a given radio channel, and perform energy detection (ED) on a surrounding radio transmission environment. When energy is lower than a threshold, the channel is determined to be clear, and only on this occasion can the transmission be started. Otherwise, the channel is determined to be busy, and the transmission node cannot perform transmission. The transmission node may be a base station, UE, Wi-Fi AP, or the like. After the transmission node starts transmission, duration of occupying the channel cannot exceed the MCOT.

On the basis of the foregoing unlicensed communications system, the following describes interlaced resource allocation.

In an unlicensed spectrum, to meet an OCB (Occupied Channel Bandwidth) and improve a transmit power while meeting a PSD (power spectral density), a resource allocation type for interlaced structures is designed. That is, frequency domain resources are divided into different interlaces, and resource allocation is based on interlaces. When a subcarrier spacing is 15 kHz, an interlace quantity M is 10 (that is, a spacing between two adjacent PRBs in an interlace), and a quantity of PRBs included in each interlace is related to bandwidth. For example, when the bandwidth is 20 MHz, a total quantity of PRBs in the bandwidth is 106, and each interlace includes 10 or 11 PRBs. When the subcarrier spacing is 30 kHz, the interlace quantity M is 5, and the quantity of PRBs included in each interlace is related to bandwidth. For example, when the bandwidth is 20 MHz, a total quantity of PRBs in the bandwidth is 51, and each interlace includes 10 or 11 PRBs.

To indicate interlace(s) allocated to UE, in resource allocation, in the case of a subcarrier spacing of 30 kHz, a 5-bit bitmap is used to indicate interlace(s) allocated to UE; and in the case of a subcarrier spacing of 15 kHz, a 10-bit bitmap or a 6-bit RIV is used to indicate allocated interlace(s).

In unlicensed communications systems, a new resource allocation scheme is introduced. That is the resource allocation type for interlaced structures. Therefore, three uplink resource allocation types are available: the uplink resource allocation type 0, the uplink resource allocation type 1, and the resource allocation type for interlaced structures. The DCI format 0_1 supports all these three resource allocation types, but no resource allocation scheme is available at present for the DCI format 0_0.

In the foregoing case, FIG. 1 is an exemplary schematic flowchart of a resource allocation method according to a first aspect and a second aspect of this disclosure. As shown in FIG. 1, the resource allocation method 100 includes the following steps.

S102: A network device (for example, a base station) transmits configuration information to user equipment (UE), and the user equipment receives the configuration information, where the configuration information includes indication information whether a PUSCH with an interlaced structure is used or not.

S104: The user equipment determines, according to the indication information whether a PUSCH with an interlaced structure is used or not, a resource allocation type for a PUSCH scheduled by DCI format 0_0 or a quantity X of bits included in frequency domain resource assignment indication information in the DCI format 0_0, where the resource allocation type is an uplink resource allocation type 1 or a resource allocation type for interlaced structures (also referred to as uplink resource allocation type 2), and X is a positive integer.

According to the resource allocation method in this disclosure, by receiving the indication information transmitted from the network device, the user equipment determines the quantity X of bits included in frequency domain resource assignment indication information in the DCI format 0_0, thereby implementing reception of the DCI format 0_0. According to the indication information, the user equipment determines the resource allocation type for a PUSCH scheduled by DCI format 0_0, so that the UE understands the DCI format 0_0, thereby resolving the present lack of a resource allocation scheme for DCI format 0_0.

As shown in FIG. 1, the network device performs step S102 to implement the embodiment of the resource configuration method provided in the second aspect of this disclosure.

In an embodiment of this disclosure, the network device may determine, according to the indication information whether a PUSCH with an interlaced structure is used or not, the resource allocation type for a PUSCH scheduled by DCI format 0_0. The resource allocation type includes the uplink resource allocation type 1 or the resource allocation type for interlaced structures.

In an embodiment of this disclosure, the network device may determine, according to the indication information whether a PUSCH with an interlaced structure is used or not, the quantity X of bits included in frequency domain resource assignment indication information in the DCI format 0_0. The network device transmits the DCI format 0_0 to the user equipment.

As shown in FIG. 1, the user equipment performs step S104 to implement the embodiment of the resource configuration method provided in the first aspect of this disclosure.

In an embodiment of this disclosure, in a case that the DCI format 0_0 is located in a common search space (CSS), the configuration information may be cell-specific configuration signaling.

In an embodiment of this disclosure, in a case that the DCI format 0_0 is located in a UE-specific search space (USS), the configuration information may be UE-dedicated (dedicated) configuration signaling.

In an embodiment of this disclosure, that the user equipment or the network device determines, according to the indication information whether a PUSCH with an interlaced structure is used or not, the resource allocation type for a PUSCH scheduled by DCI format 0_0 may include:
  in a case that the DCI format 0_0 is located in a common search space, the user equipment or the network device determines the resource allocation type to be the uplink resource allocation type 1;
  or
  in a case that the DCI format 0_0 is located in a UE-specific search space, the user equipment or the network device determines the resource allocation type according to the indication information whether a PUSCH with an interlaced structure is used or not.

In an embodiment of this disclosure, the configuration information may be cell-specific configuration signaling or UE-dedicated configuration signaling.

In an embodiment of this disclosure, that the user equipment or the network device determines, according to the indication information whether a PUSCH with an interlaced structure is used or not, the resource allocation type for a PUSCH scheduled by DCI format 0_0 may include:
  in a case that the indication information indicates that a PUSCH with an interlaced structure is used, the user equipment or the network device determines the resource allocation type to be the resource allocation type for interlaced structures;
  or
  in a case that the indication information indicates that a PUSCH with an interlaced structure is not used (for example, useInterlacePUSCH-Common-r16 is not provided or useInterlacePUSCH-Dedicated-r16 is not provided), the user equipment or the network device determines the resource allocation type to be the uplink resource allocation type 1.

In an embodiment of this disclosure, that the user equipment or the network device determines, according to the indication information whether a PUSCH with an interlaced structure is used or not, the quantity X of bits included in frequency domain resource assignment indication information in the DCI format 0_0 may include:
  in a case that the indication information indicates that a PUSCH with an interlaced structure is used, the user equipment or the network device determines the quantity X of bits based on a subcarrier spacing of an uplink bandwidth part; where in a case that the DCI format 0_0 is located in a common search space, the subcarrier spacing of an uplink bandwidth part is a subcarrier spacing (SCS) of an initial uplink bandwidth part; and in a case that the DCI format 0_0 is located in a UE-specific search space, the subcarrier spacing of an uplink bandwidth part is a subcarrier spacing of an active uplink bandwidth part;

or in a case that the indication information indicates that a PUSCH with an interlaced structure is not used, the user equipment or the network device determines the quantity X of bits based on a quantity of PRBs included in an uplink bandwidth part; where in a case that the DCI format 0_0 is located in a common search space, the uplink bandwidth part is an initial bandwidth part; and in a case that the DCI format 0_0 is located in a UE-specific search space, the uplink bandwidth part is an active uplink bandwidth part.

In an embodiment of this disclosure, in a case that the DCI format 0_0 is located in a common search space, the configuration information may be cell-specific configuration signaling.

That the user equipment or the network device determines, according to the indication information whether a PUSCH with an interlaced structure is used or not, the quantity X of bits included in frequency domain resource assignment indication information in the DCI format 0_0 may include:

in a case that the cell-specific configuration signaling indicates that a PUSCH with an interlaced structure is used, the user equipment or the network device determines the quantity X of bits based on a subcarrier spacing of an initial uplink bandwidth part;

or in a case that the cell-specific configuration signaling indicates that a PUSCH with an interlaced structure is not used, the user equipment or the network device determines the quantity X of bits based on a quantity of PRBs included in an initial uplink bandwidth part.

In an embodiment of this disclosure, in a case that the DCI format 0_0 is located in a UE-specific search space, the configuration information may be UE-dedicated configuration signaling.

That the user equipment or the network device determines the quantity X of bits according to the indication information whether a PUSCH with an interlaced structure is used or not may include:

in a case that the UE-dedicated configuration signaling includes indication information that a PUSCH with an interlaced structure is used, the user equipment or the network device determines the quantity X of bits based on a subcarrier spacing of an active uplink bandwidth part;

or in a case that the UE-dedicated configuration signaling includes indication information that a PUSCH with an interlaced structure is not used, the user equipment or the network device determines the quantity X of bits based on a quantity of PRBs included in an active uplink bandwidth part.

In an embodiment of this disclosure, that the user equipment or the network device determines, according to the indication information whether a PUSCH with an interlaced structure is used or not, the quantity X of bits included in frequency domain resource assignment indication information in the DCI format 0_0 may include:

in a case that the DCI format 0_0 is located in a common search space, the user equipment or the network device determines the quantity X of bits based on a quantity of PRBs included in an initial uplink bandwidth part;

or in a case that the DCI format 0_0 is located in a UE-specific search space, the user equipment or the network device determines the quantity X of bits according to the indication information whether a PUSCH with an interlaced structure is used or not.

It should be noted that, in this embodiment, determining according to the indication information of the network device side is required only in a case that the DCI format 0_0 is located in a UE-specific search space, and in a case that the DCI format 0_0 is located in a common search space, the indication information of the network device side is not required.

In an embodiment of this disclosure, that the user equipment or the network device determines the quantity X of bits according to the indication information whether a PUSCH with an interlaced structure is used or not may include:

in a case that the indication information indicates that a PUSCH with an interlaced structure is used, the user equipment or the network device determines the quantity X of bits based on a subcarrier spacing of an active uplink bandwidth part;

or in a case that the indication information indicates that a PUSCH with an interlaced structure is not used, the user equipment or the network device determines the quantity X of bits based on a quantity of PRBs included in an active uplink bandwidth part.

In an embodiment of this disclosure, the configuration information may be cell-specific configuration signaling or user equipment UE-dedicated configuration signaling.

In an embodiment of this disclosure, that the user equipment or the network device determines the quantity X of bits based on a subcarrier spacing of an active uplink bandwidth part may include:

in a case that a bandwidth of the active uplink bandwidth part is less than or equal to a preset threshold, the user equipment or the network device determines the quantity X of bits based on the subcarrier spacing of the active uplink bandwidth part;

or in a case that the bandwidth of the active uplink bandwidth part is greater than the preset threshold, the user equipment or the network device determines the quantity X of bits based on the subcarrier spacing of the active uplink bandwidth part and the bandwidth of the active uplink bandwidth part.

In an example, the preset threshold may be a bandwidth of one LBT bandwidth part. For example, the preset threshold is 20 MHz.

In an embodiment of this disclosure, that the user equipment or the network device determines the quantity X of bits based on the subcarrier spacing of the active uplink bandwidth part may include:

determining the quantity X of bits to be Z, where Z represents a quantity of bits used for indicating allocation of interlaced blocks.

In an embodiment of this disclosure, that the user equipment or the network device determines the quantity X of bits based on the subcarrier spacing of the active uplink bandwidth part and the bandwidth of the active uplink bandwidth part may include:

determining the quantity X of bits to be a sum of Z and Y, where Z represents a quantity of bits used for indicating allocation of interlaced blocks and Y represents a quantity of bits used for indicating listen before talk LBT bandwidth allocation.

The following further describes the resource allocation method 100 in the foregoing embodiments of the present invention with reference to a plurality of examples.

In one example, despite whether the DCI format 0_0 is located in a common search space or a UE-specific search space, the UE determines, according to the indication information whether a PUSCH with an interlaced structure is used or not included in cell-specific configuration signaling, the resource allocation type for a PUSCH scheduled by DCI format 0_0.

The following describes this example in detail.

1. If the cell-specific configuration signaling includes indication information that a PUSCH with an interlaced structure is used (such as useInterlacePUSCH-Common-r16), that is, if useInterlacePUSCH-Common-r16 is configured to "enable", indicating that a PUSCH with an interlaced structure is configured to be used, the UE determines the resource allocation type for a PUSCH scheduled by DCI format 0_0 to be the uplink resource allocation type for interlaced structures (also referred to as uplink resource allocation type 2).

The UE determines, based on a subcarrier spacing of an uplink bandwidth part, the quantity X of bits included in frequency domain resource indication information (for example, FDRA field) in the DCI format 0_0. Determining steps in detail are as follows.

(1) In a case that the DCI format 0_0 is located in a common search space, the UE determines a quantity X of bits included in the FDRA field based on a subcarrier spacing of an initial uplink bandwidth part (initial UL BWP).

The following describes the determining a quantity X of bits included in the FDRA field using two examples.

For example, when the subcarrier spacing of the initial UL BWP is 30 kHz, X=5. A 5-bit bitmap included in the FDRA field is used to indicate consecutive or non-consecutive interlaces that are allocated.

For another example, when the subcarrier spacing of an initial UL BWP is 15 kHz, X=6 or 10. If the FDRA field includes a 10-bit bitmap, the 10-bit bitmap is used to indicate consecutive or non-consecutive interlaces that are allocated. If the FDRA field includes a 6-bit RIV, the 6-bit RIV is used to indicate consecutive interlaces that are allocated.

(2) In a case that the DCI format 0_0 is located in a UE-specific search space, the UE determines the quantity X of bits included in the FDRA field based on a subcarrier spacing of an active uplink bandwidth part (active UL BWP).

The following describes the determining the quantity X of bits included in the FDRA field using an example.

For example, in a case that a bandwidth of the active uplink bandwidth part is 20 MHz, if the subcarrier spacing of the active UL BWP is 30 kHz, X=5; and if the subcarrier spacing of the active UL BWP is 15 kHz, X=6 or 10.

A 5-bit bitmap included in the FDRA field is used to indicate consecutive or non-consecutive interlaces that are allocated. A 10-bit bitmap included in the FDRA field is used to indicate consecutive or non-consecutive interlaces that are allocated. A 6-bit RIV included in the FDRA field is used to indicate consecutive interlaces that are allocated.

In a case that the bandwidth of the active UL BWP is greater than one LBT bandwidth (for example, 20 MHz), the UE determines the quantity X of bits based on the subcarrier spacing of the active UL BWP and the bandwidth of the active UL BWP.

The FDRA may further include Y bits indicating allocated LBT bandwidth(s). For example, if the bandwidth of the active UL BWP at present is 80 MHz, Y is a 4-bit bitmap used to indicate allocated LBT bandwidth(s).

2. If the cell-specific configuration signaling indicates that a PUSCH with an interlaced structure is not used, that is, if useInterlacePUSCH-Common-r16 is configured to "disable" or not configured, indicating that a PUSCH with an interlaced structure is configured not to be used, the UE determines the resource allocation type for a PUSCH scheduled by DCI format 0_0 to be the uplink resource allocation type 1.

The UE determines, according to the uplink bandwidth part, the quantity X of bits included in frequency domain resource indication information (for example, FDRA field) in the DCI format 0_0. The quantity X of bits included in the FDRA field satisfies the following formula:

$$X=\lceil \log_2(N_{RB}^{UL,BWP}(N_{RB}^{UL,BWP}+1)/2)\rceil \qquad (1)$$

If the DCI format 0_0 is located in a common search space, $N_{RB}^{UL,BWP}$ represents a quantity of PRBs included in an initial uplink bandwidth part; and if the DCI format 0_0 is located in a UE-specific search space, $N_{RB}^{UL,BWP}$ represents a quantity of PRBs included in an active uplink bandwidth part.

In another example, when the DCI format 0_0 is located in different search spaces, different methods are used for determining the resource allocation type for a PUSCH scheduled by DCI format 0_0. Details are as follows.

1. In a case that the DCI format 0_0 is located in a UE-specific search space, the UE or the network device determines, according to the indication information whether a PUSCH with an interlaced structure is used or not (for example, useInterlacePUSCH-Dedicated-r16) in UE-dedicated configuration signaling, the resource allocation type for a PUSCH scheduled by DCI format 0_0.

(1) If the UE-dedicated configuration signaling indicates that a PUSCH with an interlaced structure is used, for example, if useInterlacePUSCH-Dedicated-r16 is configured to "enable", indicating that a PUSCH with an interlaced structure is configured to be used, the user equipment or the network device determines the resource allocation type for a PUSCH scheduled by DCI format 0_0 to be an uplink resource allocation type based on an interlaced block structure.

The UE or the network device may determine, based on a subcarrier spacing of an active UL BWP, a quantity of bits included in frequency domain resource indication information (for example, FDRA field) in the DCI format 0_0.

(2) If the UE-dedicated configuration signaling indicates that a PUSCH with an interlaced structure is not used, for example, if useInterlacePUSCH-Dedicated-r16 is configured to "disable" or not configured, the user equipment or the network device determines the resource allocation type for a PUSCH scheduled by DCI format 0_0 to be the uplink resource allocation type 1.

The UE or the network device may determine, based on a quantity of PRBs included in an active UL BWP, the quantity of bits included in frequency domain resource indication information (for example, FDRA field) in the DCI format 0_0.

2. In a case that the DCI format 0_0 is located in a common search space, the UE or the network device determines, according to the indication information whether a PUSCH with an interlaced structure is used or not in cell-specific configuration signaling, the resource allocation type for a PUSCH scheduled by DCI format 0_0. The following describes different cases.

(1) If the cell-specific configuration signaling indicates that a PUSCH with an interlaced structure is used, for example, if useInterlacePUSCH-Common-r16 is configured to "enable", indicating that a PUSCH with an interlaced structure is configured to be used, the user equipment or the network device determines the resource allocation type for a PUSCH scheduled by DCI format 0_0 to be the resource allocation type for an interlaced block structure.

The UE or the network device determines, based on a subcarrier spacing of an initial UL BWP, the quantity of bits included in frequency domain resource indication information (for example, FDRA field) in the DCI format 0_0.

(2) If the cell-specific configuration signaling indicates that a PUSCH with an interlaced structure is not used, for example, if useInterlacePUSCH-Common-r16 is configured to "disable" or not configured, the user equipment or the network device determines the resource allocation type for a PUSCH scheduled by DCI format 0_0 to be the uplink resource allocation type 1.

The UE or the network device may determine, based on a quantity of PRBs included in an initial UL BWP, the quantity of bits included in frequency domain resource indication information (for example, FDRA field) in the DCI format 0_0.

In another example, for DCI format 0_0 located in different search spaces, different methods are used for determining the resource allocation type for a PUSCH scheduled by DCI format 0_0. Details are as follows.

In a case that the DCI format 0_0 is located in a UE-specific search space, the UE or the network device determines, according to the indication information whether a PUSCH with an interlaced structure is used or not in UE-dedicated configuration signaling, the resource allocation type for a PUSCH scheduled by DCI format 0_0. For DCI format 0_0 located in a common search space, the UE or the network device determines the resource allocation type for a PUSCH scheduled by DCI format 0_0 to be the uplink resource allocation type 1.

The following describes determining, according to whether DCI format 0_0 is located in a common search space or a UE-specific search space, the quantity of bits included in frequency domain resource indication information (for example, FDRA field) in the DCI format 0_0.

1. When the DCI format 0_0 is located in a common search space, the UE or the network device determines, based on a quantity of PRBs included in an initial UL BWP, the quantity of bits included in frequency domain resource indication information (for example, FDRA field) in the DCI format 0_0. Specifically, the FDRA field includes $\lceil \log_2(N_{RB}^{UL,BWP}(N_{RB}^{UL,BWP}+1)/2) \rceil$ bits, where $N_{RB}^{UL,BWP}$ represents a quantity of PRBs included in the initial UL BWP.

2. When the DCI format 0_0 is located in a UE-specific search space, the UE or the network device determines, according to the indication information whether a PUSCH with an interlaced structure is used or not in UE-dedicated configuration signaling, the quantity of bits included in frequency domain resource indication information (for example, FDRA field) in the DCI format 0_0. The following describes different cases.

(1) In a case that the UE-dedicated configuration signaling includes indication information indicating that a PUSCH with an interlaced structure is used, for example, that useInterlacePUSCH-Dedicated-r16 is configured to "enable", indicating that a PUSCH with an interlaced structure is configured to be used, the user equipment or the network device determines, based on an SCS of an active UL BWP, the quantity of bits included in frequency domain resource indication information (for example, FDRA field) in the DCI format 0_0.

For example, when the SCS of the active UL BWP is 15 kHz, the FDRA field includes a 10-bit bitmap, and the 10-bit bitmap is used to indicate consecutive or non-consecutive interlaces that are allocated, or the FDRA field includes a 6-bit RIV, and the 6-bit RIV is used to indicate consecutive interlaces that are allocated.

When the SCS of the active UL BWP is 30 kHz, the FDRA field includes a 5-bit bitmap, and the 5-bit bitmap is used to indicate consecutive or non-consecutive interlaces that are allocated.

Specially, if a bandwidth of the active UL BWP is greater than one LBT bandwidth (for example, 20 MHz), the FDRA field further includes Y bits, and the Y bits are used to indicate allocated LBT bandwidth(s). For example, if the bandwidth of the active UL BWP is 80 MHz, Y is a 4-bit bitmap.

(2) In a case that the UE-dedicated configuration signaling includes indication information that a PUSCH with an interlaced structure is not used, for example, useInterlacePUSCH-Dedicated-r16 is configured to "disable" or not configured, indicating that a PUSCH with an interlaced structure is configured not to be used, the user equipment or the network device determines, based on a quantity of PRBs of an active UL BWP, the quantity of bits included in frequency domain resource indication information (for example, FDRA field) in the DCI format 0_0.

In another example, according to whether the DCI format 0_0 is located in a UE-specific search space or a common search space, the UE or the network device performs the following steps: in a case that the DCI format 0_0 is located in a UE-specific search space, the UE or the network device determines, according to the indication information whether a PUSCH with an interlaced structure is used or not in the cell-specific configuration signaling, the resource allocation type for a PUSCH scheduled by DCI format 0_0, and for DCI format 0_0 located in a common search space, the UE or the network device determines the resource allocation type for a PUSCH scheduled by DCI format 0_0 to be the uplink resource allocation type 1.

In a case that the DCI format 0_0 is located in a common search space, the UE or network device determines, based on a quantity of PRBs included in an initial UL BWP, the quantity of bits included in frequency domain resource indication information (for example, FDRA field) in the DCI format 0_0. The frequency domain resource indication information includes $\lceil \log_2(N_{RB}^{UL,BWP}(N_{RB}^{UL,BWP}+1)/2) \rceil$ bits, where $N_{RB}^{UL,BWP}$ represents the quantity of PRBs included in the initial UL BWP.

When the DCI format 0_0 is located in a UE-specific search space, the UE or the network device determines, according to whether a PUSCH with an interlaced structure is used or not as indicated in the cell-specific configuration signaling, the quantity of bits included in frequency domain resource indication information (for example, FDRA field) in the DCI format 0_0.

Specifically, in a case that the cell-specific configuration signaling indicates that a PUSCH with an interlaced structure is used, for example, useInterlacePUSCH-Common-r16 is configured to "enable", indicating that a PUSCH with an interlaced structure is configured to be used, the user equipment or the network device determines, based on an SCS of an active UL BWP, the quantity of bits included in an FDRA field in the DCI format 0_0. Specially, if a bandwidth of the active UL BWP is greater than one LBT bandwidth (that is, 20 MHz), the FDRA field further includes a Y-bit bitmap, and the Y-bit bitmap is used to indicate allocated LBT bandwidth(s). For example, if the bandwidth of the active UL BWP is 80 MHz, the FDRA field further includes a 4-bit bitmap.

In a case that the cell-specific configuration signaling indicates that a PUSCH with an interlaced structure is not used, for example, useInterlacePUSCH-Common-r16 is configured to "disable" or not configured, indicating that a PUSCH with an interlaced structure is configured not to be used, the user equipment or the network device determines, based on a quantity of PRBs of an active UL BWP, the quantity of bits included in frequency domain resource indication information (for example, FDRA field) in the DCI format 0_0.

In another example, despite whether the DCI format 0_0 is located in a common search space or a UE-specific search space, the UE or the network device determines, according to the indication information whether a PUSCH with an interlaced structure is used or not (for example, useInterlacePUSCH-Dedicated-r16) included in UE-dedicated configuration signaling, the resource allocation type for a PUSCH scheduled by DCI format 0_0. Specific steps for the UE or the network device to determine the resource allocation type for a PUSCH scheduled by DCI format 0_0 are as follows.

1. If the UE-dedicated configuration signaling indicates that a PUSCH with an interlaced structure is used, for example, if useInterlacePUSCH-Dedicated-r16 is configured to "enable", indicating that a PUSCH with an interlaced structure is configured to be used, meaning that a PUSCH with an interlaced structure is used, the UE or the network device determines the resource allocation type for a PUSCH scheduled by DCI format 0_0 to be the resource allocation type for interlaced structures.

The quantity of bits included in the FDRA field in the DCI format 0_0 is related to a subcarrier spacing of an uplink bandwidth part.

(1) In a case that the DCI format 0_0 is located in a common search space, the UE or the network device determines, based on an SCS of an initial UL BWP, the quantity X of bits included in frequency domain resource indication information (for example, FDRA field) in the DCI format 0_0.

For example, when the SCS of the initial UL BWP is 15 kHz, the FDRA field includes a 10-bit bitmap, and the 10-bit bitmap is used to indicate consecutive or non-consecutive interlaces that are allocated. Alternatively, the FDRA field includes a 6-bit RIV, and the 6-bit RIV is used to indicate consecutive interlaces that are allocated.

When the SCS of the initial UL BWP is 30 kHz, the FDRA field includes a 5-bit bitmap used to indicate consecutive or non-consecutive interlaces that are allocated.

(2) If the DCI format 0_0 is located in a UE-specific search space, the UE or the network device determines, based on an SCS of an active UL BWP, the quantity X of bits included in frequency domain resource indication information (for example, FDRA field) in the DCI format 0_0.

For example, when the SCS of the active UL BWP is 15 kHz, the FDRA field includes a 10-bit bitmap, and the 10-bit bitmap is used to indicate consecutive or non-consecutive interlaces that are allocated. Alternatively, if the FDRA field includes a 6-bit RIV, the 6-bit RIV is used to indicate consecutive interlaces that are allocated.

When the SCS of the active UL BWP is 30 kHz, the FDRA field includes a 5-bit bitmap, and the 5-bit bitmap is used to indicate consecutive or non-consecutive interlaces that are allocated. Specially, if a bandwidth of the active UL BWP is greater than one LBT bandwidth (for example, 20 MHz), the FDRA field in the DCI format 0_0 further includes Y bits, and the Y bits are used to indicate allocated LBT bandwidth(s). For example, if the bandwidth of the active UL BWP is 80 MHz, Y is a 4-bit bitmap.

2. If the UE-dedicated configuration signaling indicates that a PUSCH with an interlaced structure is not used, for example, useInterlacePUSCH-Dedicated-r16 is configured to "disable" or not configured, indicating that a PUSCH with an interlaced structure is not used, the UE or the network device determines the resource allocation type for a PUSCH scheduled by DCI format 0_0 to be the uplink resource allocation type 1.

It should be noted that the DCI format 0_0 in the foregoing embodiment may be DCI format 0_0 with CRC scrambled by C-RNTI, CS-RNTI, MCS-RNTI, or TC-RNTI.

Figure 2:
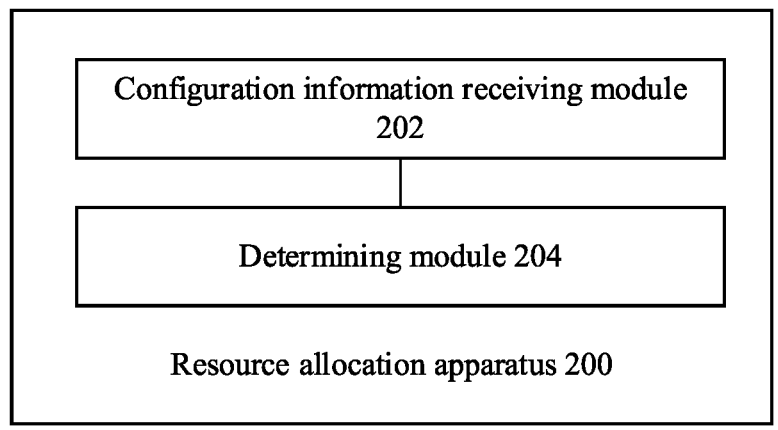
FIG. 2 is a schematic structural diagram of a resource allocation apparatus according to an embodiment of a third aspect of this disclosure.

FIG. 2 is a schematic structural diagram of a resource allocation apparatus according to an embodiment of a third aspect of this disclosure. The resource allocation apparatus is applied to user equipment, and the resource allocation apparatus 200 includes:

a configuration information receiving module 202, configured to receive configuration information, where the configuration information includes indication information whether a physical uplink shared channel PUSCH with an interlaced structure is used or not; and a determining module 204, configured to determine, according to the indication information whether a physical uplink shared channel PUSCH with an interlaced structure is used or not, a resource allocation type for a PUSCH scheduled by DCI format 0_0 or a quantity X of bits included in frequency domain resource assignment indication information in the DCI format 0_0, where the resource allocation type includes an uplink resource allocation type 1 or a resource allocation type for interlaced structures, and X is a positive integer.

In an embodiment of this disclosure, in a case that the DCI format 0_0 is located in a common search space, the configuration information may be cell-specific configuration signaling; and in a case that the DCI format 0_0 is located in a UE-specific search space, the configuration information may be UE-dedicated configuration signaling.

In an embodiment of this disclosure, the determining module 204 may include:

a first type determining module, configured to: in a case that the DCI format 0_0 is located in a common search space, determine the resource allocation type to be the uplink resource allocation type 1;

or a second type determining module, configured to: in a case that the DCI format 0_0 is located in a UE-specific search space, determine the resource allocation type according to the indication information whether a PUSCH with an interlaced structure is used or not.

In an embodiment of this disclosure, the configuration information may be cell-specific configuration signaling or UE-dedicated configuration signaling.

In an embodiment of this disclosure, the determining module 204 may include:

a third type determining module, configured to: in a case that the indication information indicates that a PUSCH with an interlaced structure is used, determine the resource allocation type to be the resource allocation type for interlaced structures;

or a fourth type determining module, configured to: in a case that the indication information indicates that a PUSCH with an interlaced structure is not used, determine the resource allocation type to be the uplink resource allocation type 1.

In an embodiment of this disclosure, the determining module may include:

a first bit quantity determining module, configured to: if the indication information indicates that a PUSCH with an interlaced structure is used, determine the quantity X of bits based on a subcarrier spacing of an uplink bandwidth part; where in a case that the DCI format 0_0 is located in a common search space, the subcarrier spacing of an uplink bandwidth part is a subcarrier spacing of an initial uplink bandwidth part; and in a case that the DCI format 0_0 is located in a UE-specific search space, the subcarrier spacing of an uplink bandwidth part is a subcarrier spacing of an active uplink bandwidth part;

or a second bit quantity determining module, configured to: if the indication information indicates that a PUSCH with an interlaced structure is not used, determine the quantity X of bits based on a quantity of PRBs included in an uplink bandwidth part; where in a case that the DCI format 0_0 is located in a common search space, the uplink bandwidth part is an initial bandwidth part; and in a case that the DCI format 0_0 is located in a UE-specific search space, the uplink bandwidth part is an active uplink bandwidth part.

In an embodiment of this disclosure, in a case that the DCI format 0_0 is located in a common search space, the configuration information is cell-specific configuration signaling. The determining module 204 may include:

a third bit quantity determining module, configured to: if the cell-specific configuration signaling indicates that a PUSCH with an interlaced structure is used, determine the quantity X of bits based on a subcarrier spacing of an initial uplink bandwidth part;

or a fourth bit quantity determining module, configured to: if the cell-specific configuration signaling indicates that a PUSCH with an interlaced structure is not used, determine the quantity X of bits based on a quantity of PRBs included in an initial uplink bandwidth part.

In an embodiment of this disclosure, in a case that the DCI format 0_0 is located in a UE-specific search space, the configuration information may be UE-dedicated configuration signaling. The determining module 204 may include:

a fifth bit quantity determining module, configured to: in a case that the UE-dedicated configuration signaling indicates that a PUSCH with an interlaced structure is used, determine the quantity X of bits based on a subcarrier spacing of an active uplink bandwidth part;

or a sixth bit quantity determining module, configured to: in a case that the UE-dedicated configuration signaling indicates that a PUSCH with an interlaced structure is not used, determine the quantity X of bits based on a quantity of PRBs included in an active uplink bandwidth part.

In an embodiment of this disclosure, the determining module 204 may include:

a seventh bit quantity determining module, configured to: in a case that the DCI format 0_0 is located in a common search space, determine the quantity X of bits based on a quantity of PRBs included in an initial uplink bandwidth part;

or an eighth bit quantity determining module, configured to: in a case that the DCI format 0_0 is located in a UE-specific search space, determine the quantity X of bits according to the indication information whether a PUSCH with an interlaced structure is used or not.

In an embodiment of this disclosure, the eighth bit quantity determining module may include:

a ninth bit quantity determining module, configured to: if the indication information indicates that a PUSCH with an interlaced structure is used, determine the quantity X of bits based on a subcarrier spacing of an active uplink bandwidth part;

or a tenth bit quantity determining module, configured to: if the indication information indicates that a PUSCH with an interlaced structure is not used, determine the quantity X of bits based on a quantity of PRBs included in an active uplink bandwidth part.

In an embodiment of this disclosure, the configuration information is cell-specific configuration signaling or user equipment UE-dedicated configuration signaling.

In an embodiment of this disclosure, the first bit quantity determining module, the fifth bit quantity determining module, or the ninth bit quantity determining module may include:

a first bit quantity determining submodule, configured to: in a case that a bandwidth of the active uplink bandwidth part is less than or equal to a preset threshold, determine the quantity X of bits based on the subcarrier spacing of the active uplink bandwidth part;

or a second bit quantity determining submodule, configured to: in a case that the bandwidth of the active uplink bandwidth part is greater than the preset threshold, determine the quantity X of bits based on the subcarrier spacing of the active uplink bandwidth part and the bandwidth of the active uplink bandwidth part.

In an embodiment of this disclosure, the first bit quantity determining submodule is specifically configured to determine the quantity X of bits to be Z, where Z represents a quantity of bits used for indicating allocation of interlaced blocks.

In an embodiment of this disclosure, the second bit quantity determining submodule is specifically configured to determine the quantity X of bits to be a sum of Z and Y, where Z represents a quantity of bits used for indicating allocation of interlaced blocks and Y represents a quantity of bits used for indicating listen before talk LBT bandwidth allocation.

Figure 3:
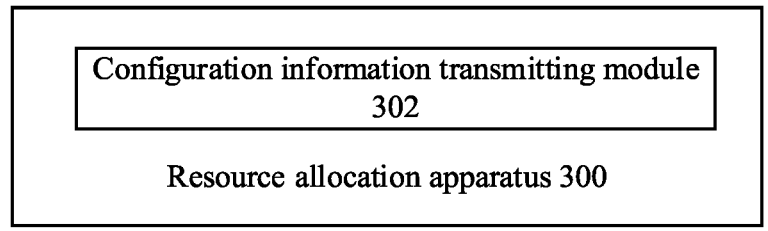
FIG. 3 is a schematic structural diagram of a resource allocation apparatus according to an in a fourth aspect of this disclosure.

FIG. 3 is a schematic structural diagram of a resource allocation apparatus according to an embodiment of a fourth aspect of this disclosure. The resource allocation apparatus is applied to a network device, and the resource allocation apparatus 300 includes:

a configuration information transmitting module 302, configured to transmit configuration information to user equipment, where the configuration information includes indication information whether a physical uplink shared channel PUSCH with an interlaced structure is used or not, such that the user equipment determines, according to the indication information, a resource allocation type for a PUSCH scheduled by DCI format 0_0 or a quantity X of bits included in frequency domain resource assignment indication information in the DCI format 0_0, where the resource allocation type includes an uplink resource allocation type 1 or a resource allocation type for interlaced structures, and X is a positive integer.

In an embodiment of this disclosure, the resource allocation apparatus 300 may further include:

a bit quantity determining module, configured to determine, according to the indication information, the quantity X of bits included in frequency domain resource assignment indication information in the DCI format 0_0.

In an embodiment of this disclosure, the resource allocation apparatus 300 may further include:

a type determining module, configured to determine, according to the indication information, the resource allocation type for a PUSCH scheduled by DCI format 0_0.

In an embodiment of this disclosure, the configuration information may be cell-specific configuration signaling or UE-dedicated configuration signaling.

In this embodiment of this disclosure, for how the network device determines the quantity X of bits included in frequency domain resource assignment indication information in the DCI format 0_0 and the resource allocation type for a PUSCH scheduled by DCI format 0_0, descriptions in detail have been given in the resource allocation method part. Details are not repeatedly described herein.

A fifth aspect of this disclosure further provides user equipment, including a processor, a memory, and a computer program stored in the memory and capable of running on the processor. When the computer program is executed by the processor, the processes in the embodiment of the resource allocation method in the first aspect are implemented, with the same technical effects achieved. To avoid repetition, details are not described herein again.

Figure 4:
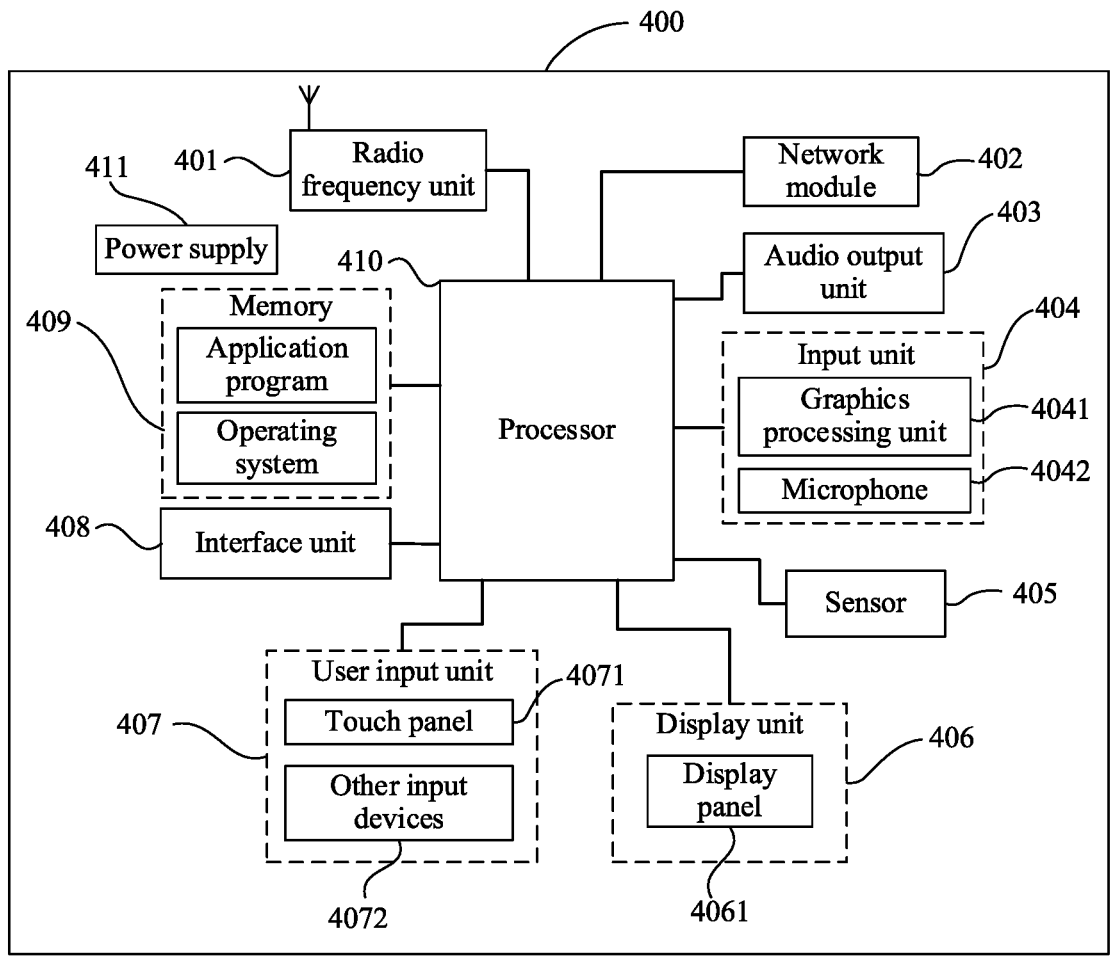
FIG. 4 is a schematic structural diagram of hardware of user equipment according to an embodiment of a fifth aspect of this disclosure.

FIG. 4 is a schematic structural diagram of hardware of user equipment according to an embodiment of the fifth aspect of this disclosure. The user equipment 400 includes but is not limited to components such as a radio frequency unit 401, a network module 402, an audio output unit 403, an input unit 404, a sensor 405, a display unit 406, a user input unit 407, an interface unit 408, a memory 409, a processor 410, and a power supply 411. A person skilled in the art can understand that the structure of the user equipment shown in FIG. 4 does not constitute any limitation on the user equipment. The user equipment may include more or fewer components than those shown in the figure, or may combine some components, or may have a different component arrangement. In this embodiment of this disclosure, the user equipment includes but is not limited to a mobile phone, a tablet computer, a laptop computer, a palmtop computer, an in-vehicle terminal, a wearable device, a pedometer, and the like.

The radio frequency unit 401 is configured to receive configuration information, where the configuration information includes indication information whether a physical uplink shared channel PUSCH with an interlaced structure is used or not.

The processor 410 is configured to determine, according to the indication information whether a PUSCH with an interlaced structure is used or not, a resource allocation type for a PUSCH scheduled by DCI format 0_0 or a quantity X of bits included in frequency domain resource assignment indication information in the DCI format 0_0, where the resource allocation type includes an uplink resource allocation type 1 or a resource allocation type for interlaced structures, and X is a positive integer.

In this embodiment of this disclosure, by receiving the indication information transmitted from the network device, the user equipment determines the quantity X of bits included in frequency domain resource assignment indication information in the DCI format 0_0, thereby implementing reception of the DCI format 0_0. According to the indication information, the user equipment determines the resource allocation type for a PUSCH scheduled by DCI format 0_0, so that the UE understands the DCI format 0_0, thereby resolving the present lack of a scheme for DCI format 0_0.

It should be understood that in this embodiment of this disclosure, the radio frequency unit 401 may be configured to send or receive a signal in an information sending/receiving or call process. Specifically, the radio frequency unit 401 receives downlink data from a base station and sends the downlink data to the processor 410 for processing; and sends uplink data to the base station. Generally, the radio frequency unit 401 includes but is not limited to an antenna, at least one amplifier, a transceiver, a coupler, a low noise amplifier, a duplexer, and the like. In addition, the radio frequency unit 401 may also communicate with a network and other devices via a wireless communications system.

The user equipment provides a user with wireless broadband internet access by using the network module 402, for example, helping the user to transmit and receive e-mails, browse web pages, and access streaming media.

The audio output unit 403 may convert audio data received by the radio frequency unit 401 or the network module 402 or stored in the memory 409 into an audio signal and output the audio signal as a sound. Moreover, the audio output unit 403 may also provide an audio output (for example, a call signal reception sound or a message reception sound) related to a specific function performed by the user equipment 400. The audio output unit 403 includes a speaker, a buzzer, a receiver, and the like.

The input unit 404 is configured to receive an audio or video signal. The input unit 404 may include a graphics processing unit (GPU) 4041 and a microphone 4042. The graphics processing unit 4041 processes image data of a static picture or a video that is obtained by image capture apparatus (for example, a camera) in a video capture mode or an image capture mode. A processed image frame may be displayed on the display unit 406. The image frame processed by the graphics processing unit 4041 may be stored in the memory 409 (or another storage medium) or transmitted by using the radio frequency unit 401 or the network module 402. The microphone 4042 is capable of receiving sounds and processing such sounds into audio data. The processed audio data can be converted in a telephone call mode into a format that can be sent to a mobile communication base station through the radio frequency unit 401, for outputting.

The user equipment 400 further includes at least one sensor 405, for example, an optical sensor, a motion sensor, and other sensors. Specifically, the light sensor includes an ambient light sensor and a proximity sensor. The ambient light sensor may adjust brightness of the display panel 4061 based on luminance of ambient light. The proximity sensor may turn off the display panel 4061 and/or backlight when the user equipment 400 approaches an ear. As a type of motion sensor, an accelerometer sensor can detect accelerations in various directions (usually, three axes), and detect, in a still state, a magnitude and a direction of gravity, and may be configured to recognize a user equipment posture (for example, screen switching between a landscape mode and a portrait mode, related games, and magnetometer posture calibration), implement vibration recognition related functions (for example, pedometer or tapping), and the like. The sensor 405 may further include a fingerprint sensor, a pressure sensor, an iris sensor, a molecular sensor, a gyroscope, a barometer, a hygrometer, a thermometer, an infrared sensor, or the like. Details are not described herein.

The display unit 406 is configured to display information input by the user or information provided to the user. The display unit 406 may include the display panel 4061. The display panel 4061 may be configured in a form of a liquid crystal display (LCD), an organic light-emitting diode (OLED), or the like.

The user input unit 407 may be configured to receive input digit or character information, and generate a key signal input related to user setting and function control of the user equipment. Specifically, the user input unit 407 includes a touch panel 4071 and other input devices 4072. The touch panel 4071 is also referred to as a touchscreen, and may collect a touch operation of the user on or near the touch panel (for example, an operation performed on or near the touch panel 4071 by the user by using any appropriate object or accessory such as a finger or a stylus). The touch panel 4071 may include two parts: a touch detection apparatus and a touch controller. The touch detection apparatus detects a touch direction of a user, detects a signal brought by a touch operation, and transmits the signal to the touch controller. The touch controller receives touch information from the touch detection apparatus, converts the touch information into touchpoint coordinates, transmits the touchpoint coordinates to the processor 410, and receives and executes a command transmitted by the processor 410. In addition, the touch panel 4071 may be implemented in a plurality of forms, for example, as a resistive, capacitive, infrared, or surface acoustic wave touch panel. In addition to the touch panel 4071, the user input unit 407 may further include other input devices 4072. Specifically, the other input devices 4072 may include but are not limited to a physical keyboard, a function key (for example, a volume control key or a power on/off key), a trackball, a mouse, and a joystick. Details are not described herein.

Further, the touch panel 4071 may cover the display panel 4061. When detecting a touch operation on or near the touch panel 4071, the touch panel 4071 transmits the touch operation to the processor 410 for determining a type of the touch event. Then, the processor 410 provides a corresponding visual output on the display panel 4061 based on the type of the touch event. In FIG. 4, the touch panel 4071 and the display panel 4061 are used as two separate parts to implement input and output functions of the user equipment. In some embodiments, however, the touch panel 4071 and the display panel 4061 may be integrated to implement the input and output functions of the user equipment. No specific limitation is defined herein.

The interface unit 408 is an interface between an external apparatus and the user equipment 400. For example, the external apparatus may include a wired or wireless headphone port, an external power (or battery charger) port, a wired or wireless data port, a memory card port, a port for connecting an apparatus with an identification module, an audio input/output (I/O) port, a video I/O port, or an earphone port. The interface unit 408 may be configured to receive an input (for example, data information or power) from the external apparatus and transmit the received input to one or more elements of the user equipment 400, or transmit data between the external apparatus and the user equipment 400.

The memory 409 may be configured to store software programs and various data. The memory 409 may primarily include a program storage area and a data storage area. The program storage area may store an operating system, an application program (such as an audio play function and an image play function) required by at least one function, and the like. The data storage area may store data (such as audio data and a phone book) created based on use of the mobile phone. In addition, the memory 409 may include a high-speed random access memory, and may further include a non-volatile memory such as a disk storage device, a flash memory device, or another volatile solid-state storage device. The memory 409 may store a computer program, and when the computer program is executed by a processor 410, the processes in the embodiment of the resource allocation method in the first aspect are implemented.

The user equipment 400 further includes the power supply 411 (for example, a battery) for supplying power to the components. In an example, the power supply 411 may be logically connected to the processor 410 through a power management system. In this way, functions such as charge management, discharge management, and power consumption management are implemented by using the power management system.

In addition, the user equipment 400 includes some functional modules not shown. Details are not described herein.

According to a sixth aspect of this disclosure, a network device is provided, including a processor, a memory, and a computer program stored in the memory and capable of running on the processor. When the computer program is executed by the processor, the processes in the embodiment of the resource allocation method of the second aspect are implemented, with the same technical effects achieved. To avoid repetition, details are not described herein again.

According to a seventh aspect of this disclosure, a computer-readable storage medium is provided, where the computer-readable storage medium stores a computer program. When the computer program is executed by a processor, the processes in the embodiment of the resource allocation method of the first or second aspect are implemented, with the same technical effects achieved. To avoid repetition, details are not described herein again. Examples of the computer-readable storage medium include a non-transitory computer-readable storage medium such as a read-only memory (ROM), a random access memory (RAM), a magnetic disk, or an optical disc.

It should be noted that in this specification, the term "comprise", "include", or any other variant thereof is intended to cover a non-exclusive inclusion, such that a process, method, article, or apparatus that includes a list of elements not only includes those elements but also includes other elements that are not expressly listed, or further includes elements inherent to such process, method, article, or apparatus. Without more constraints, an element preceded by "includes a . . . " does not preclude existence of other identical elements in the process, method, article, or apparatus that includes the element.

Various aspects of this disclosure are described above with reference to the flowcharts and/or the block diagrams of the method, apparatus (system), or computer program product in the embodiments of this disclosure. It should be understood that each block in the flowcharts and/or the block diagrams and a combination of blocks in the flowcharts and/or the block diagrams may be implemented by computer program instructions. These computer program instructions may be provided to a processor of a general-purpose computer, a special-purpose computer, or another programmable data processing apparatus to produce a machine, such that these instructions executed by the processor of the computer or another programmable data processing apparatus enable the implementation of the functions/actions specified in one or more blocks of the flowcharts and/or block diagrams. The processor may be but is not limited to a general-purpose processor, a special-purpose processor, a special application processor, or a field programmable logic circuit. It should be further noted that each block in the block diagrams and/or the flowcharts and a combination of the blocks in the block diagrams and/or the flowcharts may alternatively be implemented by a dedicated hardware-based system for executing a specified function or action or may be implemented by a combination of dedicated hardware and computer instructions.

According to the descriptions of the foregoing embodiments, a person skilled in the art may clearly understand that the methods in the foregoing embodiments may be implemented by using software in combination with a necessary common hardware platform, and certainly may alternatively be implemented by using hardware or software. However, in most cases, a combination of hardware and software is a preferred embodiment. Based on such an understanding, the embodiments of this disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A resource allocation method, applied to user equipment, wherein the method comprises:
   receiving configuration information, wherein the configuration information comprises indication information whether a physical uplink shared channel (PUSCH) with an interlaced structure is used or not; and
   determining, according to the indication information whether a PUSCH with an interlaced structure is used or not, a quantity X of bits comprised in frequency domain resource assignment indication information in DCI format 0_0, wherein X is a positive integer;
   the determining the quantity X of bits according to the indication information whether a PUSCH with an interlaced structure is used or not comprises:
   in a case that the configuration information is UE-dedicated configuration signaling, and the UE-dedicated configuration signaling indicates that a PUSCH with an interlaced structure is used, determining the quantity X of bits based on a subcarrier spacing of an active uplink bandwidth part;
   or
   in a case that the configuration information is UE-dedicated configuration signaling, and the UE-dedicated configuration signaling indicates that a PUSCH with an interlaced structure is not used, determining the quantity X of bits based on a quantity of PRBs comprised in an active uplink bandwidth part;
   wherein the determining the quantity X of bits based on a subcarrier spacing of an active uplink bandwidth part comprises:
   in a case that a bandwidth of the active uplink bandwidth part is less than or equal to a preset threshold, determining the quantity X of bits based on the subcarrier spacing of the active uplink bandwidth part;
   or
   in a case that the bandwidth of the active uplink bandwidth part is greater than the preset threshold, determining the quantity X of bits based on the subcarrier spacing of the active uplink bandwidth part and the bandwidth of the active uplink bandwidth part.

2. The method according to claim 1,
   wherein the determining the quantity X of bits based on the subcarrier spacing of the active uplink bandwidth part comprises:
   determining the quantity X of bits to be Z, wherein Z represents a quantity of bits used for indicating allocation of interlaced blocks.

3. The method according to claim 1,
   wherein the determining the quantity X of bits based on the subcarrier spacing of the active uplink bandwidth part and the bandwidth of the active uplink bandwidth part comprises:
   determining the quantity X of bits to be a sum of Z and Y, wherein Z represents a quantity of bits used for indicating allocation of interlaced blocks and Y represents a quantity of bits used for indicating listen before talk (LBT) bandwidth allocation.

4. The method according to claim 1,
   wherein, the method further comprises:
   determining, according to the indication information whether a PUSCH with an interlaced structure is used or not, a resource allocation type for a PUSCH scheduled by the downlink control information (DCI) format 0_0, wherein the resource allocation type comprises an uplink resource allocation type 1 or a resource allocation type for interlaced structures.

5. The method according to claim 4,
   wherein the determining, according to the indication information whether a PUSCH with an interlaced structure is used or not, a resource allocation type for a PUSCH scheduled by DCI format 0_0 comprises:
   in a case that the indication information indicates that a PUSCH with an interlaced structure is used, determining the resource allocation type to be the resource allocation type for interlaced structures;
   or
   in a case that the indication information indicates that a PUSCH with an interlaced structure is not used, determining the resource allocation type to be the uplink resource allocation type 1.

6. The method according to claim 1, wherein the determining the quantity X of bits according to the indication information whether a PUSCH with an interlaced structure is used or not comprises:
   in a case that the configuration information is cell-specific configuration signaling, and the cell-specific configuration signaling indicates that a PUSCH with an interlaced structure is not used, determining the quantity X of bits based on a quantity of PRBs comprised in an initial uplink bandwidth part.

7. The method according to claim 1,
wherein in a case that the DCI format 0_0 is located in a common search space, the configuration information is cell-specific configuration signaling;
or
in a case that the DCI format 0_0 is located in a UE-specific search space, the configuration information is UE-dedicated configuration signaling.

8. A resource allocation method, applied to a network device, wherein the method comprises:
transmitting configuration information to user equipment, wherein the configuration information comprises indication information whether a physical uplink shared channel PUSCH with an interlaced structure is used or not, such that the user equipment determines, according to the indication information, a quantity X of bits comprised in frequency domain resource assignment indication information in DCI format 0_0, wherein X is a positive integer;
the determining the quantity X of bits according to the indication information whether a PUSCH with an interlaced structure is used or not comprises:
in a case that the configuration information is UE-dedicated configuration signaling, and the UE-dedicated configuration signaling indicates that a PUSCH with an interlaced structure is used, determining the quantity X of bits based on a subcarrier spacing of an active uplink bandwidth part;
or
in a case that the configuration information is UE-dedicated configuration signaling, and the UE-dedicated configuration signaling indicates that a PUSCH with an interlaced structure is not used, determining the quantity X of bits based on a quantity of PRBs comprised in an active uplink bandwidth part;
wherein the determining the quantity X of bits based on a subcarrier spacing of an active uplink bandwidth part comprises:
in a case that a bandwidth of the active uplink bandwidth part is less than or equal to a preset threshold, determining the quantity X of bits based on the subcarrier spacing of the active uplink bandwidth part;
or
in a case that the bandwidth of the active uplink bandwidth part is greater than the preset threshold, determining the quantity X of bits based on the subcarrier spacing of the active uplink bandwidth part and the bandwidth of the active uplink bandwidth part.

9. The method according to claim 8,
wherein the determining the quantity X of bits according to the indication information whether a PUSCH with an interlaced structure is used or not comprises:
in a case that the configuration information is cell-specific configuration signaling, and the cell-specific configuration signaling indicates that a PUSCH with an interlaced structure is not used, determining the quantity X of bits based on a quantity of PRBs comprised in an initial uplink bandwidth part.

10. User equipment (UE), comprising a processor, a memory, and a computer program that is stored in the memory and capable of running on the processor, wherein the computer program, when being executed by the processor, implements the steps of:

receiving configuration information, wherein the configuration information comprises indication information whether a physical uplink shared channel (PUSCH) with an interlaced structure is used or not; and
determining, according to the indication information whether a PUSCH with an interlaced structure is used or not, a quantity X of bits comprised in frequency domain resource assignment indication information in DCI format 0_0, wherein X is a positive integer;
the determining the quantity X of bits according to the indication information whether a PUSCH with an interlaced structure is used or not comprises:
in a case that the configuration information is UE-dedicated configuration signaling, and the UE-dedicated configuration signaling indicates that a PUSCH with an interlaced structure is used, determining the quantity X of bits based on a subcarrier spacing of an active uplink bandwidth part;
or
in a case that the configuration information is UE-dedicated configuration signaling, and the UE-dedicated configuration signaling indicates that a PUSCH with an interlaced structure is not used, determining the quantity X of bits based on a quantity of PRBs comprised in an active uplink bandwidth part;
wherein the determining the quantity X of bits based on a subcarrier spacing of an active uplink bandwidth part comprises:
in a case that a bandwidth of the active uplink bandwidth part is less than or equal to a preset threshold, determining the quantity X of bits based on the subcarrier spacing of the active uplink bandwidth part;
or
in a case that the bandwidth of the active uplink bandwidth part is greater than the preset threshold, determining the quantity X of bits based on the subcarrier spacing of the active uplink bandwidth part and the bandwidth of the active uplink bandwidth part.

11. The UE according to claim 10, wherein the determining the quantity X of bits based on the subcarrier spacing of the active uplink bandwidth part comprises:
determining the quantity X of bits to be Z, wherein Z represents a quantity of bits used for indicating allocation of interlaced blocks.

12. The UE according to claim 11, wherein the determining the quantity X of bits based on the subcarrier spacing of the active uplink bandwidth part and the bandwidth of the active uplink bandwidth part comprises:
determining the quantity X of bits to be a sum of Z and Y, wherein Z represents a quantity of bits used for indicating allocation of interlaced blocks and Y represents a quantity of bits used for indicating listen before talk (LBT) bandwidth allocation.

13. The UE according to claim 10, wherein the determining the quantity X of bits according to the indication information whether a PUSCH with an interlaced structure is used or not comprises:
in a case that the configuration information is cell-specific configuration signaling, and the cell-specific configuration signaling indicates that a PUSCH with an interlaced structure is not used, determining the quantity X of bits based on a quantity of PRBs comprised in an initial uplink bandwidth part.

14. The UE according to claim 10, wherein, the steps further comprises:
determining, according to the indication information whether a PUSCH with an interlaced structure is used or not, a resource allocation type for a PUSCH scheduled by the downlink control information (DCI) format 0_0, wherein the resource allocation type comprises an uplink resource allocation type 1 or a resource allocation type for interlaced structures.

15. The UE according to claim 14, wherein the determining, according to the indication information whether a PUSCH with an interlaced structure is used or not, a resource allocation type for a PUSCH scheduled by DCI format 0_0 comprises:
 in a case that the indication information indicates that a PUSCH with an interlaced structure is used, determining the resource allocation type to be the resource allocation type for interlaced structures;
 or
 in a case that the indication information indicates that a PUSCH with an interlaced structure is not used, determining the resource allocation type to be the uplink resource allocation type 1.

16. A network device, comprising a processor, a memory, and a computer program that is stored in the memory and capable of running on the processor, wherein when the computer program is executed by the processor, the steps of the resource allocation method according to claim 8 are implemented.

17. A non-transitory computer-readable storage medium, wherein the computer-readable storage medium stores a computer program, and when the computer program is executed by a processor, the steps of the resource allocation method according to claim 1 are implemented.

18. The non-transitory computer-readable storage medium according to claim 17,
 wherein the determining the quantity X of bits based on the subcarrier spacing of the active uplink bandwidth part comprises:
 determining the quantity X of bits to be Z, wherein Z represents a quantity of bits used for indicating allocation of interlaced blocks.

19. The non-transitory computer-readable storage medium according to claim 17, wherein the determining the quantity X of bits based on the subcarrier spacing of the active uplink bandwidth part and the bandwidth of the active uplink bandwidth part comprises:
 determining the quantity X of bits to be a sum of Z and Y, wherein Z represents a quantity of bits used for indicating allocation of interlaced blocks and Y represents a quantity of bits used for indicating listen before talk (LBT) bandwidth allocation.

20. The non-transitory computer-readable storage medium according to claim 17, wherein the determining the quantity X of bits according to the indication information whether a PUSCH with an interlaced structure is used or not comprises:
 in a case that the configuration information is cell-specific configuration signaling, and the cell-specific configuration signaling indicates that a PUSCH with an interlaced structure is not used, determining the quantity X of bits based on a quantity of PRBs comprised in an initial uplink bandwidth part.

* * * * *